United States Patent [19]
Touzeau

[11] Patent Number: 6,006,086
[45] Date of Patent: Dec. 21, 1999

[54] TELECOMMUNICATION DEVICE COMPRISING A BASE STATION AND AT LEAST ONE MOBILE UNIT AND METHOD OF CONNECTING A MOBILE UNIT TO A BASE STATION

[75] Inventor: Patrick Touzeau, Le Mans, France

[73] Assignee: U.S. Philips Corporation, New York, N.Y.

[21] Appl. No.: 08/970,885

[22] Filed: Nov. 14, 1997

[30] Foreign Application Priority Data

Nov. 22, 1996 [FR] France ................................ 96 14316

[51] Int. Cl.⁶ .................................................. H04Q 7/20
[52] U.S. Cl. ......................... 455/411; 455/410; 455/88; 455/462
[58] Field of Search .................................. 455/411, 410, 455/88, 573, 6.3

[56] References Cited

U.S. PATENT DOCUMENTS

| | | | |
|---|---|---|---|
| 4,467,140 | 8/1984 | Fathauer et al. | 455/462 |
| 5,097,500 | 3/1992 | Itoh | 455/411 |
| 5,448,764 | 9/1995 | Sondermann et al. | 455/410 |
| 5,495,520 | 2/1996 | Kojima | 455/411 |
| 5,790,423 | 8/1998 | Lau et al. | 364/400.01 |

FOREIGN PATENT DOCUMENTS

| | | | |
|---|---|---|---|
| 0301573A2 | 2/1989 | European Pat. Off. | 379/110 |
| 4138935A1 | 6/1993 | Germany | 379/110 |

*Primary Examiner*—Wellington Chin
*Assistant Examiner*—Blane J. Jackson
*Attorney, Agent, or Firm*—Dicran Halajian

[57] ABSTRACT

A communication system and method of connecting a mobile unit to a base station are disclosed where a connection code is stored in the base unit which is the serial number thereof. The connection code is either entered by the user of the mobile unit or is stored therein. This connection code is transmitted from the mobile unit to the base station before a communication between them is established. Such a communication is established if the connection code transmitted from the mobile unit equals to the connection code stored in the base unit.

4 Claims, 2 Drawing Sheets

TELECOMMUNICATION DEVICE COMPRISING A BASE STATION AND AT LEAST ONE MOBILE UNIT AND METHOD OF CONNECTING A MOBILE UNIT TO A BASE STATION

BACKGROUND OF THE INVENTION

The invention relates to a telecommunication device comprising a base station and at least one mobile unit allowing of being connected to said base station.

The invention also relates to a connection method for connecting a mobile unit to a base station.

Such units, known as wireless telephones, are currently used and provide much ease of use to the users because of the number of functions they offer to the users.

A problem posed with this type of unit is the problem of connecting a mobile unit to a base station. When one wishes to realize this connection, the connection has to be validated inside the base unit.

This validation procedure for known units is executed in that the base station switches the unit into service. This base station thus invites all the mobile units that receive a signal sequence broadcast in a relatively large environment to be connected to the base station. This, however, presents a large drawback. A mobile unit belonging to a dishonest neighbor of the base station's proprietor may acquire this sequence and then validate the neighbor's own unit, so that the communications he will establish will afterwards be billed to the base station's proprietor who has triggered the validation procedure.

OBJECTS AND SUMMARY OF THE INVENTION

The invention proposes a device of the type mentioned in the opening paragraph which to a large extent avoids the drawback mentioned above.

Therefore, such a device is characterized in that a connection code is assigned to the base station, in that the mobile unit to be connected comprises acquiring means for the user to acquire this code and in that this acquired code is to be recognized by the base station for a connection to be validated.

These and other aspects of the invention will be apparent from and elucidated with reference to the embodiments described hereinafter.

DETAILED DESCRIPTION OF THE PREFERRED EMBODIMENT

Figure 1:
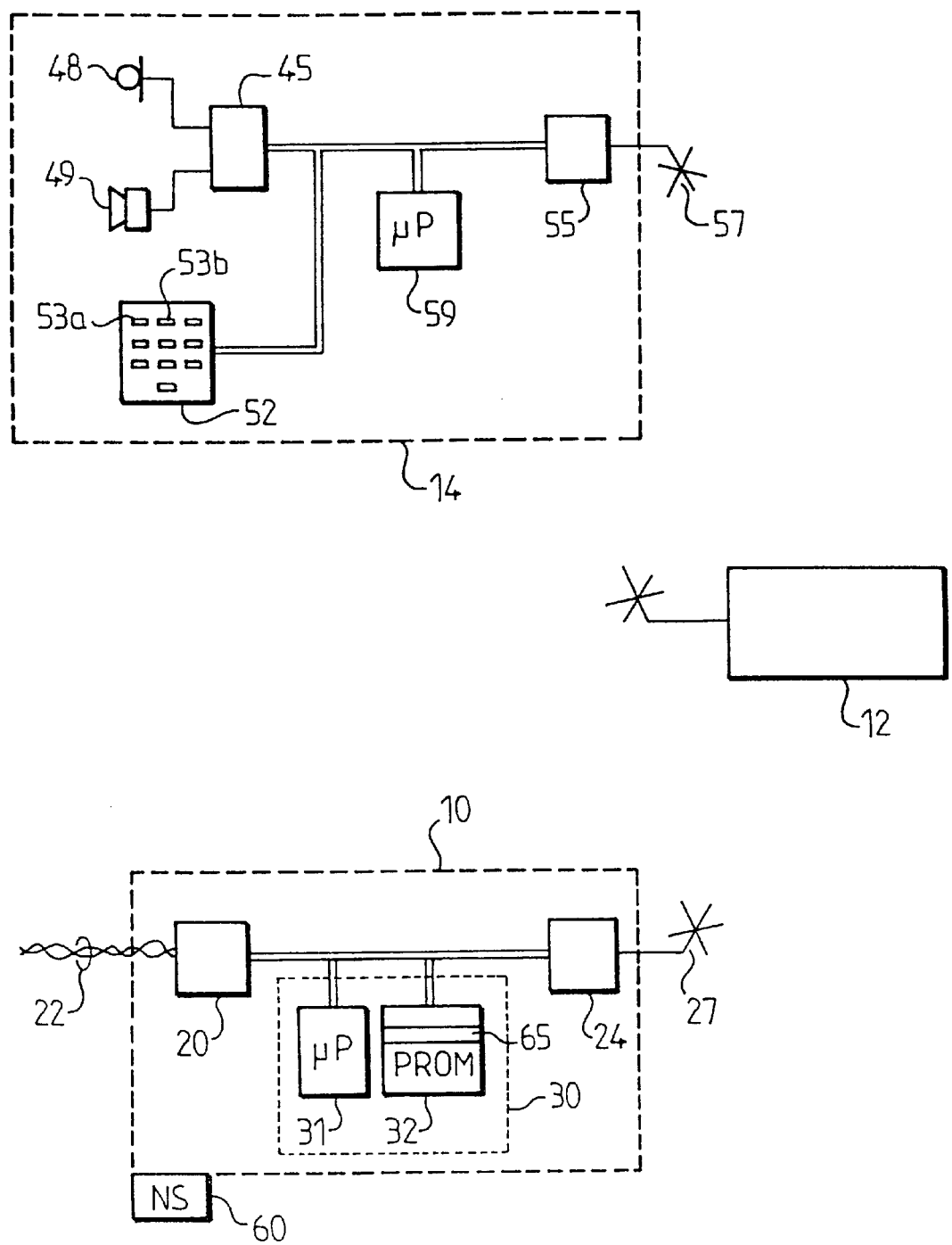
FIG. 1 shows a device according to the invention.

The device shown in FIG. 1 is a wireless telephone of the type known as CTO. It is formed by a base station 10 and two mobile units 12 and 14.

The base station 10 is formed by a connection circuit 20 for allowing a connection to a telephone line 22. The base station is also formed by a transceiver circuit 24 coupled to an antenna 27, to communicate with the various mobile units connected thereto by radio channel. Within the scope of the described example, only mobile unit 12 is connected. The base station 10 also includes a microprocessor assembly 30 which runs instructions for using notably the means according to the invention. This assembly 30 notably comprises the actual microprocessor 31 and a read-only memory 32. The connection to a base station enables the base station to verify that the access to the telephone line 22 is given to any mobile unit it recognizes.

Mobile unit 14, which has an identical structure to that of unit 12, is shown in more detail in this FIG. 1. This unit 14 is to be connected to the base station 10 in accordance with the measures of the invention. This unit comprises an audio circuit 45 to which are connected a microphone 48 and a loudspeaker 49. It also comprises a keyboard 52 with a plurality of keys 53a, 53b, . . . , a transceiver circuit 55 coupled to an antenna 57, and a microprocessor assembly 59 which runs instructions for notably utilizing the means according to the invention and which thus ensures the operation of the unit.

According to the invention, a connection code is assigned to the base station, for example, its serial number NS engraved on its back, which is indicated by reference 60 in FIG. 1. This number is also carried to a location 65 of memory 32 for later comparisons. The user is to enter this serial number on the keyboard 52 which number is then transmitted to the base station 10 by the use of the radio link. The base station then verifies this number and the connection of this unit is validated.

Figure 2:
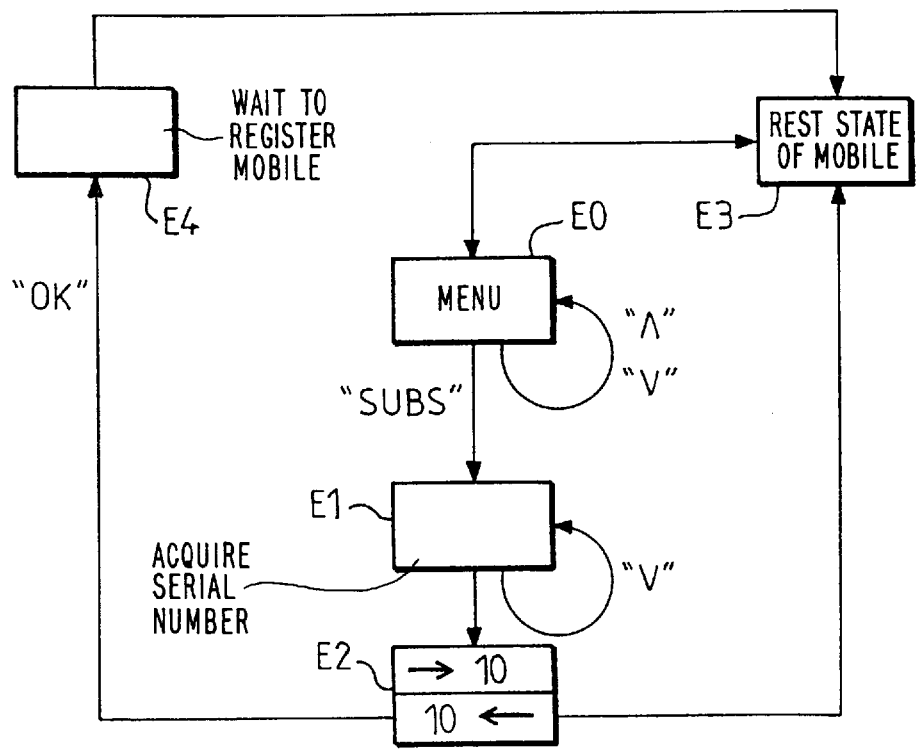
FIGS. 2 and 3 are the diagrams for explaining the respective operation of a mobile unit and a base station.

The operation of such a device is explained with the aid of FIG. 2. This FIG. 2 shows various states of operation of the mobile unit which attempts to be connected to its base station. One starts with state E0 which indicates the choice of an item from a menu. By actuating the "Λ" and "V" movement keys, one ends at the sub-menu "SUBS" which permits of the connection. Then one goes to the E1 state upon the user's action (validation), which is the state that permits the user to acquire the serial number NS used for the identification of the base station. During this acquisition, one may also use the "Λ" key for authorizing a correction. Once this number has been acquired after validation, one proceeds to the E2 state which consists of the transmission of this code to the base station in a first step and of the reception of a possible message from the base station. If this base station does not respond, or if it is busy transmitting to another mobile unit, or if it declares that the acquired code is not a correct code, one proceeds to the E3 state which is the state of rest of the mobile unit. If the base station declares that the acquired code is correct (OK), then one goes to step E4 which is a timing step for leaving the base station 10 the time to register its mobile unit and send an identification code to the mobile unit which the latter stores. The mobile unit then changes to the above-mentioned E3 state.

Figure 3:
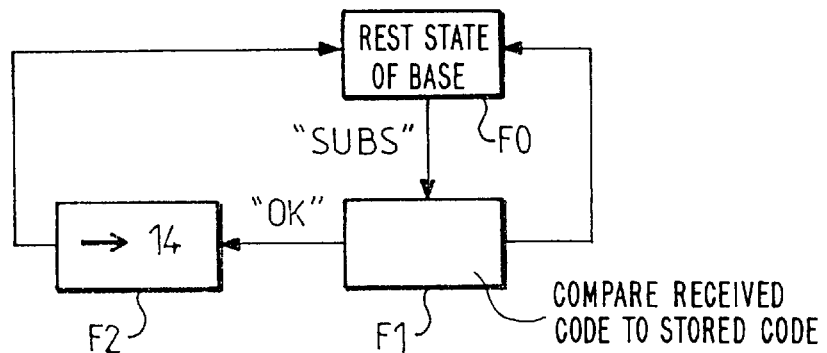

The operation of the base station is explained with the aid of FIG. 3. One starts from state F0, which is considered the state of rest of the base station allowing of receiving messages from various mobile units. The reception of a message "SUBS" meaning that a connection is requested causes the base station 10 to go to the state F1. In this state the base station examines whether the connection code corresponds well to that in location 65 of memory 32. If it does, after validation made manually on the user's base station, one goes to state F2 where an identification code is sent to the mobile unit. If the connection code does not match, state F0 is returned to. After state F2, state F0 is returned to also.

Thus, the mobile unit will have to transmit this identification code before each communication it undertakes is started. If this code is not recognized by the base station, it will not be possible to establish this communication.

I claim:

1. A communication system comprising a base station and at least one mobile unit connectable to said base station, wherein a connection code is assigned to the base station, said connection code signal being a serial number of the base station, and wherein the mobile unit comprises acquiring means for a user to acquire said connection code, a connection between said base station and said mobile unit being validated after said base station recognizes said connection code received from said mobile unit.

2. A method of connecting a mobile unit to a base station comprising:

storing a connection code in a memory of said base station, said connection code signal being a serial number of said base station;

entering a user code by a user of said mobile unit;

transmitting said user code from said mobile unit to said base station; and validating said mobile unit by said base station if said user code equals to said connection code.

3. The method of claim 2, further comprising:

storing said connection code in said mobile unit; and transmitting said connection code to said base station before a communication between said mobile unit and said base unit is established.

4. A method of connecting a mobile unit to a base station comprising:

storing a connection code in said mobile station and said base station, said connection code being a serial number of said base station;

transmitting said connection code from said mobile unit to said base station before a communication between said mobile unit and said base unit is established; and establishing said communication if said connection code transmitted from said mobile unit equals to said connection code stored in said base unit.

* * * * *